United States Patent [19]

English

[11] Patent Number: 5,419,500
[45] Date of Patent: May 30, 1995

[54] METHOD FOR CREATING PLASTIC SLIVERS

[75] Inventor: Brent W. English, Barneveld, Wis.

[73] Assignee: The United States of America as represented by the Secretary of Agriculture, Washington, D.C.

[21] Appl. No.: 291,247

[22] Filed: Aug. 16, 1994

Related U.S. Application Data

[62] Division of Ser. No. 165,125, Dec. 10, 1993, abandoned.

[51] Int. Cl.6 .............................................. B02C 19/00
[52] U.S. Cl. ...................................... 241/30; 264/113
[58] Field of Search ............................ 241/23, 28, 30; 264/113, 114, 115, 121, 122, 140, 174

[56] References Cited

U.S. PATENT DOCUMENTS

| | | | |
|---|---|---|---|
| 2,856,976 | 10/1958 | MacDougall | 241/280 X |
| 3,062,460 | 11/1962 | Bunney | 241/222 X |
| 3,186,277 | 6/1965 | Brunner | 241/222 X |
| 3,526,163 | 9/1970 | Lowry | 83/27 |
| 3,685,748 | 8/1972 | Beck et al. | 241/41 |
| 3,746,062 | 7/1973 | Nystrom et al. | 241/296 X |
| 3,806,562 | 4/1974 | Lamort et al. | 264/31 |
| 3,810,555 | 5/1974 | Bakker et al. | 241/280 X |
| 3,837,584 | 9/1974 | Lehr et al. | 241/280 X |
| 4,107,827 | 4/1978 | Sasshofer | 28/246 |
| 4,145,389 | 3/1979 | Smith | 264/113 X |
| 4,164,329 | 8/1979 | Highy | 241/296 X |
| 4,229,397 | 10/1980 | Fukuta et al. | 264/113 |
| 4,408,976 | 10/1983 | Parker, Jr. | 425/301 |
| 4,499,037 | 2/1985 | Parker, Jr. | 264/37 |
| 4,527,899 | 7/1985 | Blach et al. | 366/79 |
| 4,747,552 | 5/1988 | Takasaki | 241/292.1 |
| 4,894,192 | 1/1990 | Warych | 264/68 |
| 4,932,595 | 6/1990 | Cohen et al. | 241/99 |
| 5,009,586 | 4/1991 | Pallmann | 425/311 |
| 5,178,336 | 1/1993 | Lodovico et al. | 241/99 |

*Primary Examiner*—Timothy V. Eley
*Attorney, Agent, or Firm*—M. Howard Silverstein; John D. Fado; Janet I. Stockhausen

[57] ABSTRACT

The invention concerns itself with an apparatus and method for producing plastic slivers from plastic infeed stock. The splinters produced are especially suitable for use in plastic or cellulosic/plastic composites. The invention will readily accommodate a broad range of types and forms of plastic infeed stock, including waste plastic, whether or not it has been cleaned and sorted into homogeneous feed streams. The method cuts plastic into slivers by firmly holding the plastic infeed stock and slowly feeding it against rotating cutter heads. The feed mechanism automatically adjusts to varying amounts of feed stock. The slivers need no further processing before they can be used in composites.

3 Claims, 8 Drawing Sheets

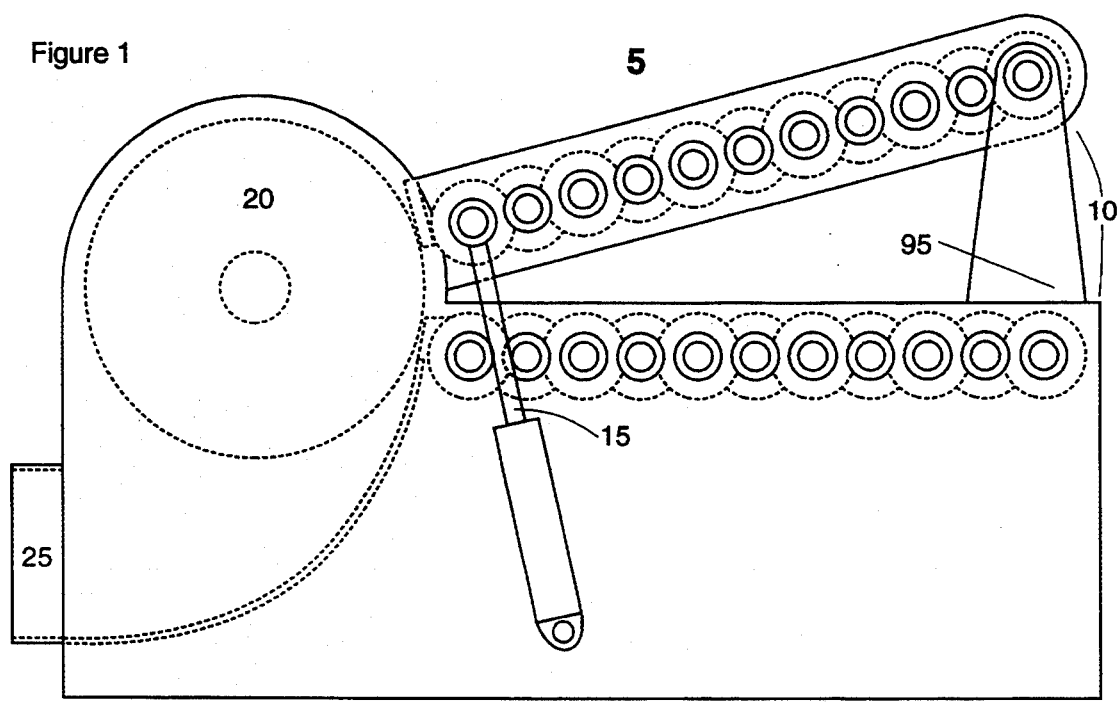

METHOD FOR CREATING PLASTIC SLIVERS

This is a division of application Ser. No. 08/165,125, filed Dec. 10, 1993, now abandoned.

BACKGROUND OF THE INVENTION

1. Field of the Invention

The present invention relates in general to the processing of materials into a usable form, and in particular to the creation of plastic slivers from plastic materials. The plastic slivers are especially suitable for use in composites of cellulosic and plastic materials.

2. Description of the Invention

The art of creating cellulosic/plastic composites is well-known; see, e.g., U.S. Pat. Nos. 5,082,605, 5,088,910, and 5,096,046, among others. Generally, two or more dissimilar materials, at least one of which is a thermoplastic, serve as the source material. The source materials are blended together and introduced into a carrier fluid, e.g. air. The carrier fluid passes through a screen and deposits the blended materials onto the screen in the form of a mat. After the mat has been formed it is pressed into flat panels or molded shapes using a heated press. During pressing the plastic melts and flows around the cellulosic fibers, thereby encapsulating them and creating a rigid structure. An additional chemical binder may be used if the plastic does not impart sufficient binding strength. Some typical applications for air-laid composites are interior automotive panels, which are later overlaid with vinyl or carpeting, and curved furniture components such as chair seats.

The depletion of our natural resources and increased problems with waste disposal are also well-known. The energy and raw material required to create plastics and the over-flowing of landfills make the recycling of plastics an attractive option to landfilling plastic waste. Using recycled plastics in cellulosic/plastic composites would therefore be appealing if an economically feasible method of preparing them for such use was available.

Several problems exist, however, in using recycled plastics in cellulosic/plastic composites. Different types of recycled plastics are often mixed together and contain contaminants such as food and labels. Prior methods of making plastic fibers for use in composites have generally involved melting the plastic as a step in the fiber-making process (i.e. as a step prior to extrusion). These methods require the plastic to be homogeneous and free of contaminants, or the different plastics (with different melting points) and any existing impurities will at the very least cause the process to go awry; at most, they may possibly ruin the apparatus used to make the fibers. Impurities can foul flow passages in machinery used for melting plastic, and mixtures of different melted plastics generally cannot be formed into fibers of uniform shape and quality due to irregularities in the melting temperatures and viscosity (and hence the flow properties) of the mixture. The greatest problems arise when blow molding grade plastics such as HDPE, with low fractional melt indices, are introduced into the mix; they cannot be formed into fibers by extrusion processes because their viscosities are too high to form a fiber when forced through a die. The cleaning and sorting steps in processing the plastic tend to be time-consuming and expensive, and the heating necessary to melt the plastic adds additional expense due to the energy-intensive heating process. Some fiber production methods are able to sidestep one or more of these requirements, but they invariably have their drawbacks. U.S. Pat. No. 4,107,827 describes a method for producing fibers from waste plastic stock by a mechanical process, rather than by a melting process, but it requires the plastic fiber stock to be pre-formed into a cylinder (and thus melted and possibly cleaned and sorted). U.S. Pat. No. 3,806,562 describes a method for producing stock for composites out of waste plastic without any cleaning or sorting steps, but it requires heating and extensive machining. U.S. Pat. Nos. 4,408,976 and 4,499,037 describe methods for producing plastic composite stock from plastic tubes, but they cannot be applied to stock with a non-tubular shape. The present invention resolves these problems by providing a method and apparatus for converting plastic waste into fibrous plastic composite stock which does not require melting, nor extensive cleaning, nor homogeneity of the waste plastic stock.

SUMMARY OF THE INVENTION

It is an object of the present invention to create plastic slivers from recycled plastic which are suitable for use in cellulosic/plastic composites. Such slivers are 0.01–0.03 mm thick, 1–3 mm wide, and 10–30 mm long. The plastic slivers are large enough to become entangled within the mat during the initial blending of the materials and their subsequent deposition onto the screen. This entangling results in near complete utilization of the plastic slivers, rather than substantial loss of slivers through the screen.

It is also an object of the present invention to provide a method and apparatus which will accommodate a broad range of recycled plastic, such as high density polyethylene (HDPE) milk jugs, detergent bottles, food cartons, oil containers, and others.

It is another object of the present invention to provide an energy-saving method and apparatus. The present invention uses solely mechanical means to create the plastic slivers. No heating step is required, thereby decreasing the energy requirements of the invention.

It is yet another object of the present invention to provide an efficient system with low operating costs. The present invention can accept plastic which has not been prepared by sorting or extensive cleaning, including waste plastic which still has labels attached. This ability to accept a wide variety of plastics decreases both plastic preparation time and costs.

It is still another object of the present invention to provide a plastic fiber for use in cellulosic/plastic composites which does not require an additional chemical binder in the composite-creating process. The plastic slivers serve as a binder in the composite by melting and flowing around the cellulosic fibers during a heating and pressing step. If the slivers are of a size and shape that allow them to mix well with and sufficiently entangle the cellulosic fibers, the melting process allows them to better encapsulate the cellulosic fibers and impart greater binding strength, eliminating the need for an additional chemical binder. The lack of an additional chemical binder reduces the amount of potentially hazardous emissions and discharges from the composite-creation process.

The present invention comprises an apparatus with an infeed assembly, a dampener, a cutter assembly, and a discharge chute.

Plastics are fed to the cutter assembly by the infeed assembly. The infeed assembly consists of two parts, an infeed conveyor and a pinch conveyor. Each of these is comprised of a series of overlapping feed rolls which converge towards the cutter assembly. Drive mechanisms are attached to the two parts to regulate the speed of the feed rolls, which in turn determines the feed rate of the plastics into the cutter assembly. The convergence of the two parts compresses and holds the plastics in a secure manner as they are fed into the cutter assembly.

A dampener may connect the two ends of the infeed parts closest to the cutter assembly. The dampener automatically adjusts the distance between the two ends of the infeed parts to accommodate variations in plastic volume.

The cutter assembly consists of a plurality of individual cutters which cut individual slivers from the plastic. Sliver thickness is determined by the feed rate and the cutter's rate of revolution, width is determined by the thickness of the plastic, and length is determined by the width of the cutters. After they are cut, the slivers fall through the discharge chute and may then be removed for use.

BRIEF DESCRIPTION OF THE DRAWINGS

FIG. 1 is a side view of the preferred embodiment of the present invention.

DETAILED DESCRIPTION OF THE PREFERRED EMBODIMENT

Figure 3:
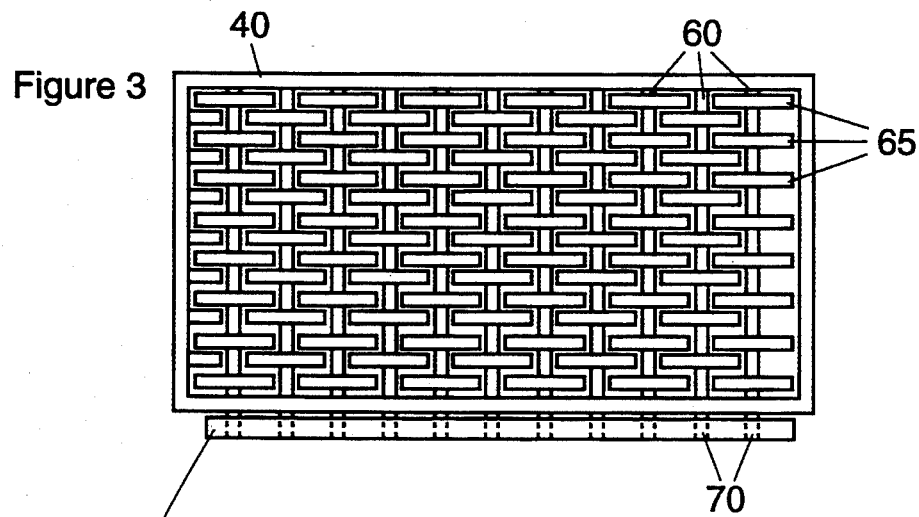
FIG. 3 is a top view of the feed means.

The preferred embodiment of the present invention, shown in FIG. 1, is an apparatus 5 comprising an infeed assembly 10, a dampener 15, a cutter assembly 20, and a discharge chute 25.

Figure 2:
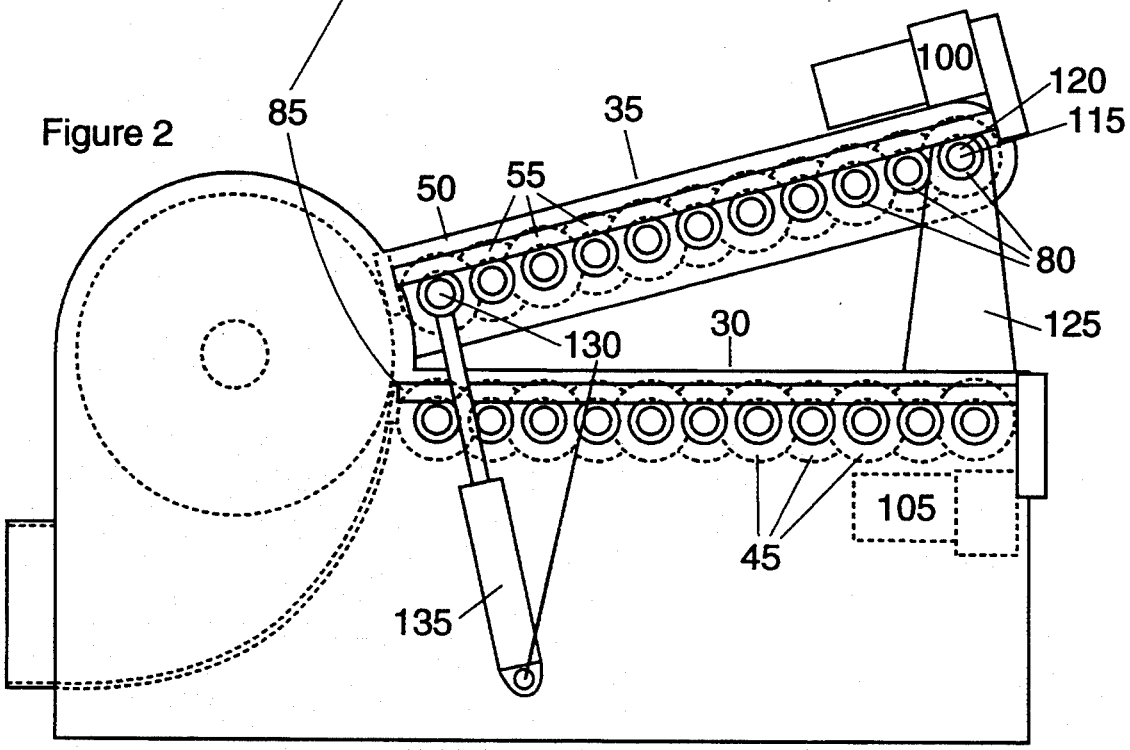
FIG. 2 is a side view of the infeed assembly.
Figure 4A:
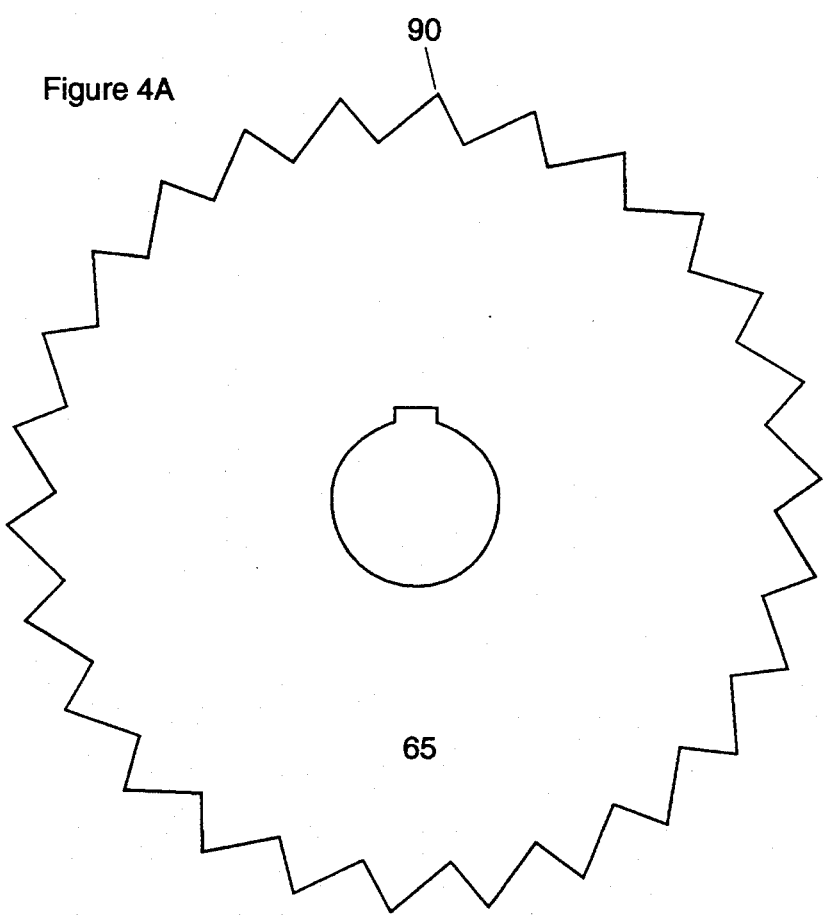
FIG. 4A is a side view of a feed roll.
Figure 4B:
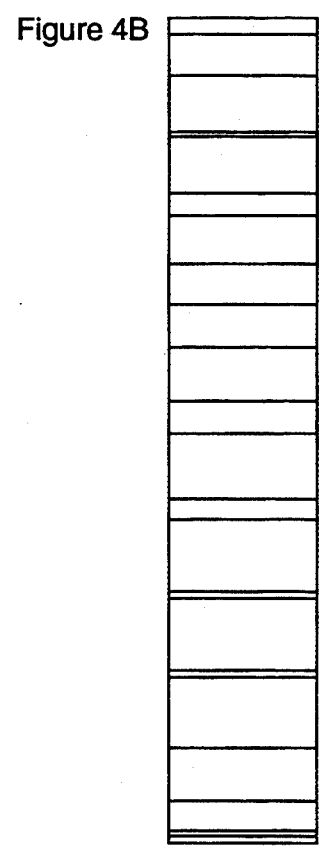
FIG. 4B is a front view of a feed roll.

The infeed assembly 10 consists of an infeed conveyor 30 and a pinch conveyor 35 as shown in FIG. 2. The infeed conveyor 30 consists of an infeed conveyor frame 40 with a roller array 45 resting within, and the pinch conveyor 35 consists of a pinch conveyor frame 50 and a pinch roller array 55 in a similar arrangement. A top view of the infeed conveyor 30 or pinch conveyor 35 is shown in FIG. 3. The roller array and pinch roller array are both comprised of a plurality of feed rolls 60. Each feed roll comprises a plurality of feed wheels 65 centrally mounted about a feed roll shaft 70. The feed roll shafts 70 are attached to the conveyor frames (40+50) by bearing sleeves (not shown), which allow the feed roll shafts 70 to rotate within the conveyor frames (40+50). Each feed roll shaft 70 has gearing 80 at one end that allows it to be driven rotationally by a worm screw 85. The feed wheels 65 are substantially circular with teeth 90 extending from their circumferences, as shown in FIG. 4A. The teeth 90, shown from the front in FIG. 4B, allow the roller array 45 and pinch roller array 55 to better grip the infeed plastic as it passes through the infeed assembly 10. As shown in FIG. 3, the feed rolls 60 overlap each other, with the radii of the feed wheels 65 on one feed roll 60 overlapping the radii of the feed wheels 65 on the adjacent feed roll 60. This overlap increases the area of contact between the infeed plastic and the feed rolls 60.

The infeed conveyor 30 performs most of the work of carrying the infeed plastic to the cutter assembly 20. At the infeed point 95, infeed plastic is placed on the infeed conveyor 30, whose roller array 45 rotates so as to carry the infeed plastic towards the cutter assembly 20. The infeed conveyor 30 functions alone until the infeed plastic is carried far enough towards the cutter assembly 20 that it comes into contact with the pinch conveyor 35, whose pinch roller array 55 then also begins to grip and carry the infeed plastic. The pinch conveyor 35 is aligned so that the pinch roller array 55 is not on a plane parallel to the roller array 45, but rather at an acute angle to it. Therefore, when the infeed plastic reaches a point where it comes into contact with both the infeed conveyor 30 and the pinch conveyor 35, it begins to compress as the teeth 90 on the feed wheels 65 drive the infeed plastic into the narrowing gap between the conveyors 30, 35, towards the cutter assembly 20.

The feed roll drives 100, 105, shown in FIG. 2, are connected to both the infeed conveyor 30 and the pinch conveyor 35. The feed roll drives 100, 105, shown in FIG. 3, are electric motors which drive the feed rolls 60 through a drive shaft and worm screw 85 arrangement. The worm screws 85 engage the gearing on the ends of the feed roll shafts 70. When the feed roll drives 100, 105, are activated, they cause the drive shaft to rotate, which in turn causes the worm screws 85 and the feed rolls 60 to rotate. The speed of the feed roll drives 100, 105, is adjustable by the operator, so the operator may regulate the speed at which the feed rolls 60 are rotating and control the feed rate of the infeed plastic into the cutter assembly 20.

In order to better enable the infeed assembly 10 with the ability to better transport large amounts of infeed plastic, the pinch conveyor 35 is allowed to rotate about a pinch pivot 115, as shown in FIG. 2. The pinch pivot 115 consists of a sturdy pivot shaft 120 which extends through the pinch conveyor 35, supporting the weight of the pinch conveyor 35 at its end near the infeed point 95 and allowing rotation of the pinch conveyor 35 about the pivot shaft 120. This allows the end of the pinch conveyor 35 opposite the infeed point to raise or lower, thereby accommodating greater or lesser amounts of infeed plastic. The pivot shaft 120 is affixed to the pivot prop 125, which is in turn affixed to the infeed conveyor frame 40 so that the end of the pinch conveyor 35 near the infeed point 95, though the pivot shaft 120 allows it to rotate.

As shown in FIG. 2, the end of the pinch conveyor 35 opposite the infeed point 95 is supported by a dampener 15. The ends of the dampener 15 are attached to the infeed conveyor frame 40 and the pinch conveyor frame 50 by dampener pins 130, about which the dampener 15 may pivot. The dampener 15 controls the distance and angle between the infeed conveyor 30 and the pinch conveyor 35, and prevents the pinch conveyor 35 from bucking as the amount of infeed varies. The dampener 15 essentially comprises a hydraulic cylinder 135 which slowly lengthens and contracts as the amount of infeed plastic grows and shrinks, allowing only gradual changes in the angle of the pinch conveyor 35. The dampener 15 is preloaded to provide a predetermined distance and angle between the infeed conveyor 30 and the pinch conveyor 35. When more infeed plastic is fed into the infeed assembly 10 than the space between the infeed conveyor 30 and the pinch conveyor 35 can easily accommodate, the dampener will allow the distance between the infeed conveyor 30 and the pinch conveyor 35 to increase until the forces exerted by the infeed plastic against the conveyors 30, 35 equal the internal tension of the hydraulic cylinder 135. When the flow of infeed plastic abates, the forces exerted by the dampener 15 against the conveyors 30, 35 will likewise abate, and the dampener 15 will return to its original preloaded setting. This automatic adjustment feature provided by the dampener 15 allows the infeed assembly 10 to compensate for varying amounts of infeed plastic and insures that the infeed assembly 10 will hold the infeed plastic securely in place when it is fed into cutter assembly 20.

Figure 5:
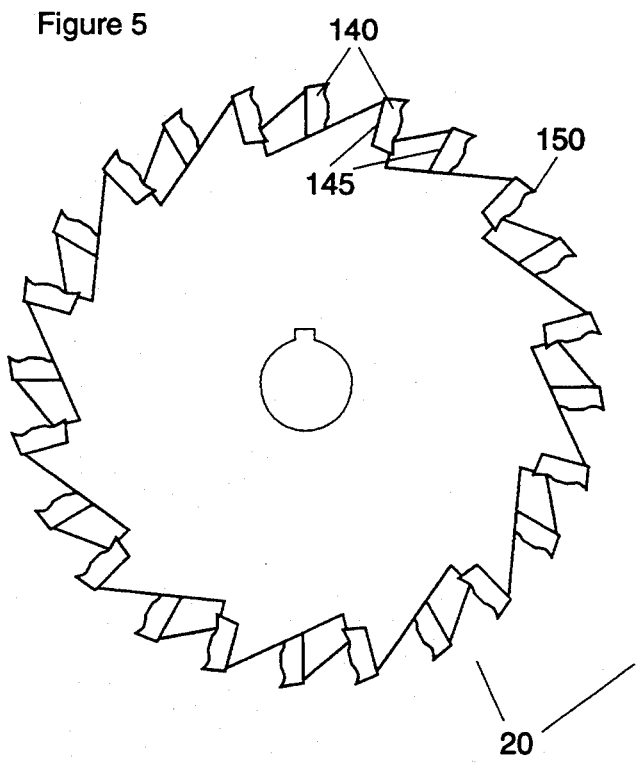
FIG. 5 is a side view of the cutter assembly.
Figure 6:
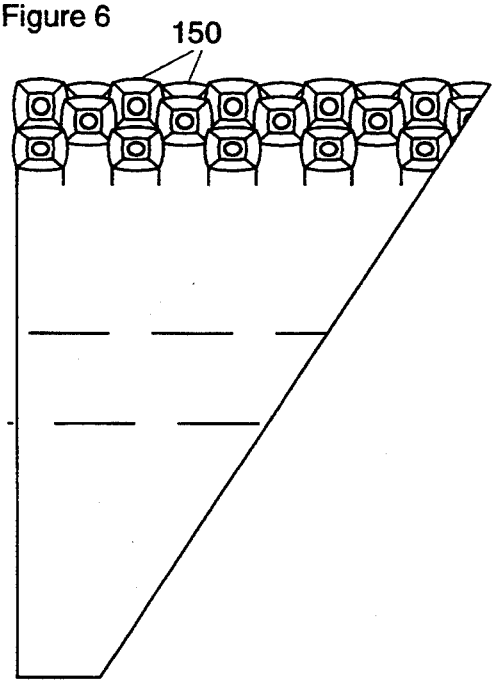
FIG. 6 is a top partial view of the cutter assembly.

The cutter assembly 20 is shown in detail in FIGS. 5 and 6. The cutter assembly 20 is essentially cylindrical in shape with multiple cutter heads 140 securely attached to its periphery. As shown in FIG. 5, each of the cutter heads 140 is fastened to one of the multiple cutter head seats 145, which protrude from the surface of the cutter assembly 20. Each cutter head 140 has four cutting edges 150 of sufficient sharpness to cut the infeed plastic. Only one cutting edge 150 is used to cut the infeed plastic at a given time. This edge, the cutting edge 150, is at the outer circumference of the cutter assembly 20. The cutter assembly 20 rotates to bring the cutting edge 150 of each cutter head 140 into contact with the infeed plastic. The rotating speed of the cutter assembly 20 is adjustable by the operator, which helps to avoid "smearing" problems—melting of the plastic due to friction from a too-fast cutting speed. The rotating speed of the cutter assembly 20, the infeed rate of the conveyors 30, 35, and the placement of the cutter heads 140 insure that only the cutting edge 150 will make contact with the infeed plastic. The cutter heads 140 are staggered to insure that individual full length slivers are removed from the infeed plastic, resulting in complete utilization of the infeed plastic. After being cut, the plastic slivers will fall down into the discharge chute 25, as shown in FIG. 1.

Figure 7:
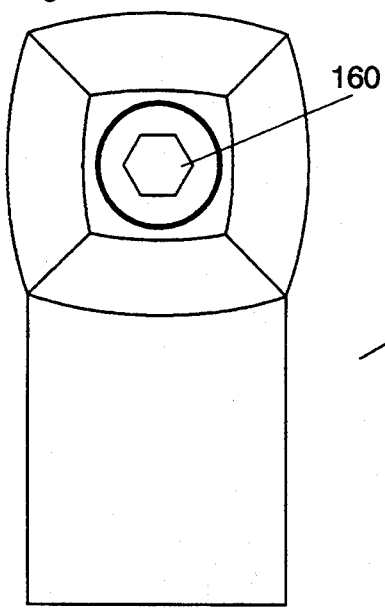
FIG. 7 is an enlarged top view of a cutter.
Figure 8:
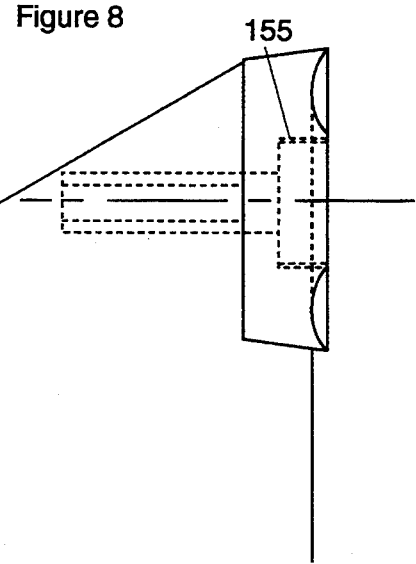
FIG. 8 is an enlarged side view of a cutter.

FIGS. 7 and 8 better show the attachment of the cutter heads 140 to the cutter head seats 145. Each cutter head 140 has a threaded screw aperture 155 through which a hold-down screw 160 may be extended into the cutter head seat 145. The cutter heads 140 are ideally constructed of carbide, however, any other material with sufficient strength to act as a cutting edge could be used, such as high-speed steel. As a cutting edge 150 wears and grows dull, the hold-down screws 160 may be removed and the cutter head 140 may be rotated so that a new cutting edge 150 is used. Alternatively, the cutter head 140 can be replaced, or it can merely be taken out for sharpening.

Since the thickness of each sliver is determined by the amount of infeed plastic that falls under the cutter head 140 immediately prior to the cutter head 140 contacting the infeed plastic, the feed rate and the rate of rotation of the cutter assembly 20 determine the sliver thickness. Sliver width is determined by the thickness of the infeed plastic in the plane perpendicular to the infeed conveyor 30, and sliver length is determined by the width of the cutter heads 140. The cutter head seats 145 are angled such that the cutting edge 150 has a cutting shear force substantially perpendicular to the plane of the infeed conveyor 30 at the moment the cutting edge 150 contacts the infeed plastic.

Figure 9:
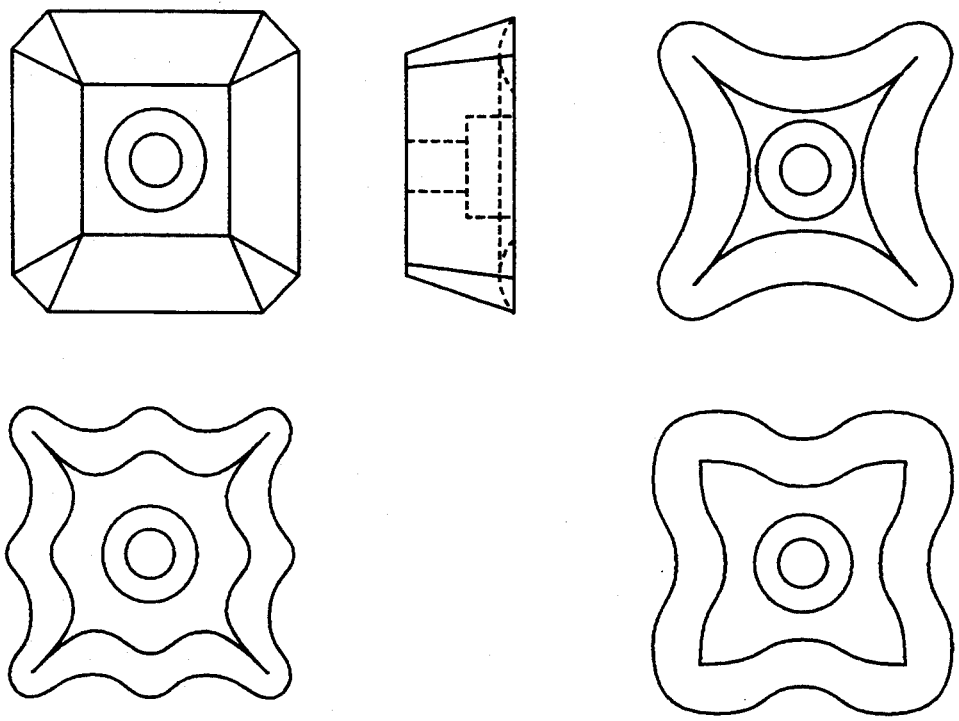
FIG. 9 is an enlarged top view of alternate cutter configurations.
Figure 10:
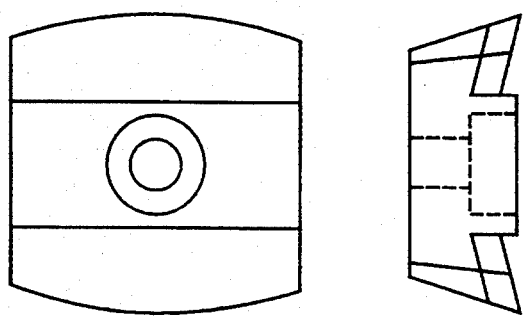
FIG. 10 is an enlarged top view of a two-edged cutter configuration.

The cutter head 140 shown in FIGS. 7 and 8 is only one of various configurations the cutter head 140 could have. Several other possible configurations are shown in FIGS. 9 and 10; FIG. 9 shows a two-edged configuration, and FIG. 10 shows four different four-edged configurations. The shape of the resultant plastic slivers will depend on the configuration of the cutter head 140 used by the operator. For example, the curved-edged configuration of FIG. 10 could be used to create slivers with rounded edges or curled slivers. The ability to modify the shape of the slivers is helpful, as a different sliver shape may be used to increase entangling of the plastic slivers with the cellulosic fibers used to make cellulosic-plastic composites.

Figure 11:
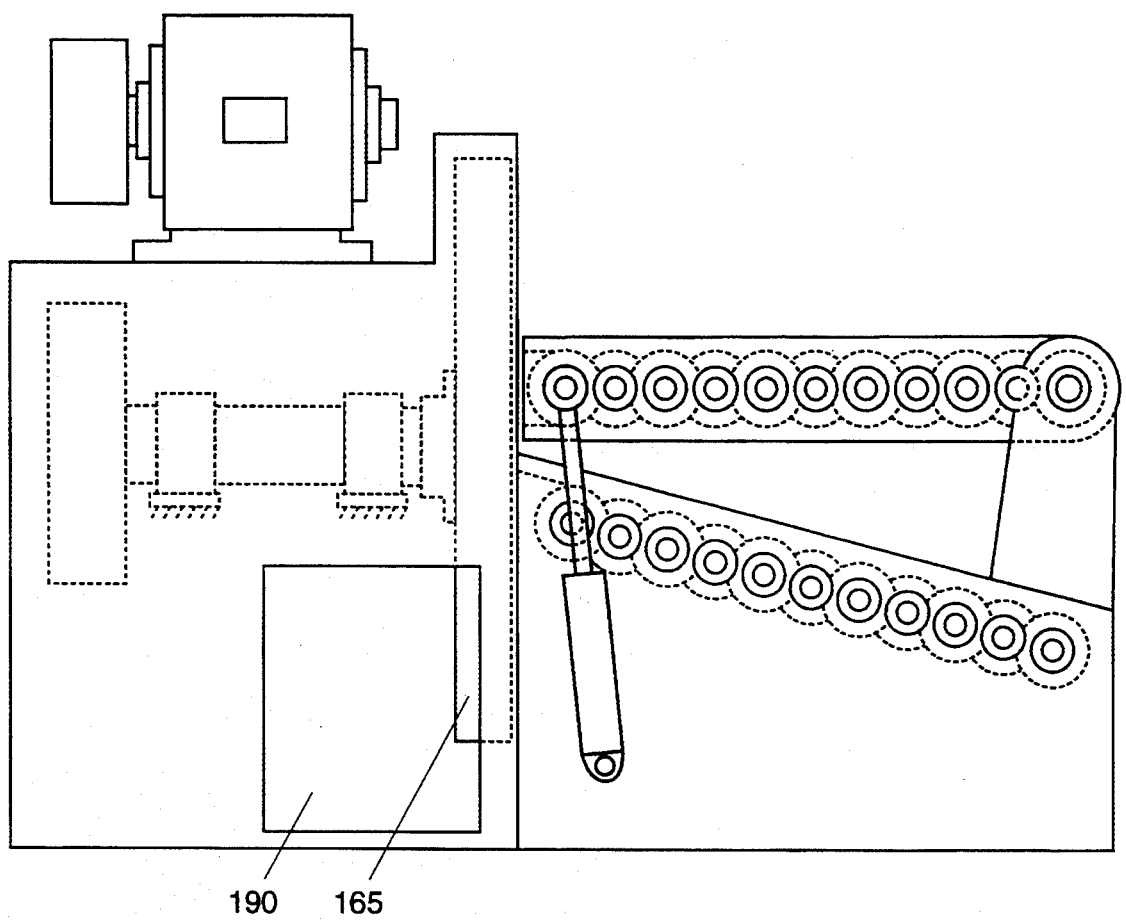
FIG. 11 is a side view of an alternate embodiment of the present invention.
Figure 12:
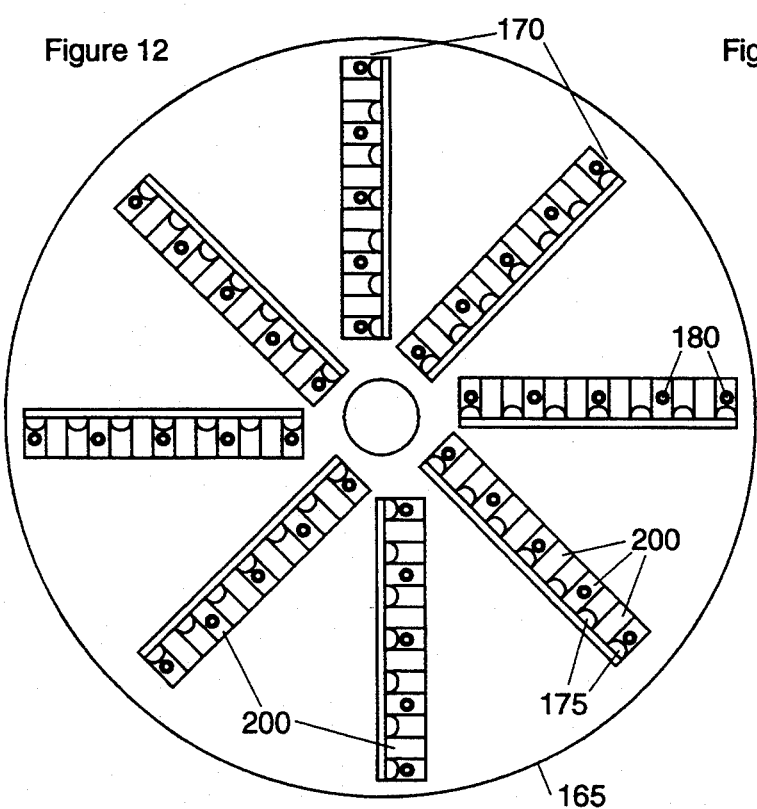
FIG. 12 is a front view of an alternate cutter assembly.
Figure 13:
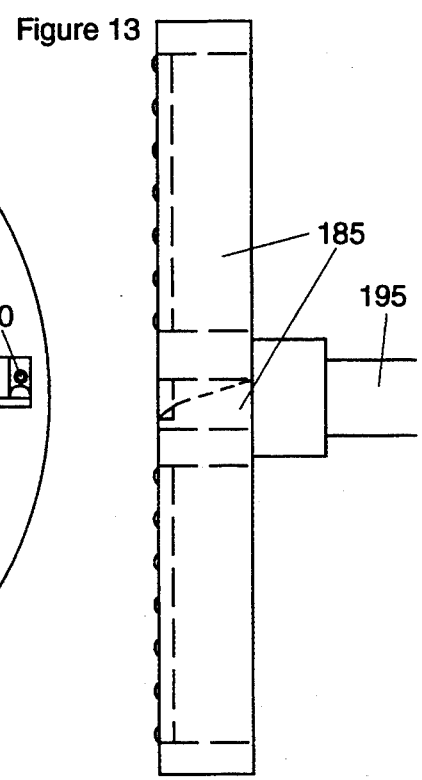
FIG. 13 is a side view of an alternate cutter assembly.

An alternate embodiment of the present invention is shown in FIG. 11. The alternate apparatus has a cutter assembly 165 in the form of a disc-style cutter, rather than a drum-style cutter as in the apparatus of FIG. 1. Aside from this change, the alternate apparatus is substantially identical to the apparatus of FIG. 1. The cutter assembly 165 of FIG. 11 is shown in detail in FIGS. 12 and 13. The cutter heads 175 here take the form of cutter head rows 170, which are made of a series of attached cutter heads 175. The cutter head rows 170 are fastened to the cutter assembly 165 via hold-down screws 180. The cutter assembly 165 shown has eight cutter head rows 170 of seven cutter heads 175 each; however, the number of cutter head rows 170 and the number of cutter heads 175 within each cutter head row 170 could be increased or decreased. A discharge slot 185 is cut in the cutter assembly 165 in front of each row. After a sliver is cut it falls through a discharge slot 185 and into the discharge chute 190. Each of the cutter heads 175 in a cutter head row 170 is separated by a space 200 with substantially the same width as a cutter head 175. The placement of cutter heads 175 and spaces 200 are staggered between rows so that a cutter head 175 on one cutter head row 170 corresponds to a space 200 on the following cutter head row 170. Therefore, when the cutter assembly 165 revolves about its axis 195, the cutter heads 175 in a cutter head row 170 cut the infeed plastic and leave intact the infeed plastic at the area corresponding to the spaces 200. As the cutter assembly 165 revolves further, the cutter heads 175 in the following cutter head row 170 cut the infeed plastic at the area on the infeed plastic that the prior cutter head 175 missed. This staggering insures that the infeed plastic is completely converted to slivers.

It is understood that the invention is not confined to the particular construction and arrangement of parts herein illustrated and described, but embraces such modified forms thereof as come within the scope of the following claims.

What is claimed is:

1. A method of recycling thin-walled plastic containers comprising the steps of:
 a) cutting the containers into elongate slivers by:
  1) compressing the containers between opposed conveying surfaces;
  2) conveying the crushed containers at a predetermined conveyor rate along a conveyor axis toward a cutter having a plurality of cutter heads each with a cutting edge;

3) moving the plurality of cutter heads at a cutter rate in a substantially perpendicular direction to the conveyor axis so that a swept width of each cutting edge is substantially equal to a largest dimension of the sliver; and
4) adjusting the relative speed of the cutter rate and the conveyor rate to control a second largest dimension of the sliver; and b) entangling the slivers together to form a mat; and
c) compressing and heating the mat to form a composite panel.

2. A method of recycling thin-walled plastic containers comprising the steps of:
   a) cutting the containers into elongate slivers by:
      1) compressing the containers between opposed conveying surfaces;
      2) conveying the crushed containers at a predetermined conveyor rate along a conveyor axis toward a cutter having a plurality of cutter heads each with a cutting edge;
      3) moving the plurality of cutter heads at a cutter rate in a substantially perpendicular direction to the conveyor axis so that a swept width of each cutting edge is substantially equal to a largest dimension of the sliver;
      4) adjusting the relative speed of the cutter rate and the conveyor rate to control a second largest dimension of the sliver, wherein the cutter heads are arranged and the cutter rate and the conveyor rate are controlled, so that substantially only slivers equal to the full swept width of the cutter edges are produced; and
   b) entangling the slivers together to form a mat; and
   c) compressing and heating the mat to form a composite panel.

3. A method of recycling thin-walled plastic containers comprising the steps of:
   a) cutting the containers into elongate slivers by:
      1) compressing the containers between opposed conveying surfaces;
      2) conveying the crushed containers at a predetermined conveyor rate along a conveyor axis toward a cutter having a plurality of cutter heads each with a cutting edge, wherein the cutting edges are curved to provide arcuate slivers;
      3) moving the plurality of cutter heads at a cutter rate in a substantially perpendicular direction to the conveyor axis so that a swept width of each cutting edge is substantially equal to a largest dimension of the sliver; and
      4) adjusting the relative speed of the cutter rate and the conveyor rate to control a second largest dimension of the sliver; and
   b) entangling the slivers together to form a mat; and
   c) compressing and heating the mat to form a composite panel.

* * * * *